United States Patent [19]

Safranek

[11] Patent Number: 4,852,540
[45] Date of Patent: Aug. 1, 1989

[54] HIGH-EFFICIENCY CHARGING AND REGULATING SYSTEM

[75] Inventor: Edward J. Safranek, Arlington Heights, Ill.

[73] Assignee: F & B Mfg Co., Gurnee, Ill.

[21] Appl. No.: 191,877

[22] Filed: May 9, 1988

[51] Int. Cl.$^4$ .......................... F02P 3/06; H02J 7/14
[52] U.S. Cl. ............................ 123/599; 123/149 D; 320/40; 320/61; 322/94
[58] Field of Search ............ 123/147 A, 149 D, 599, 123/602; 320/39, 40, 59, 61, DIG. 2; 322/89, 94

[56] References Cited

U.S. PATENT DOCUMENTS

| | | | |
|---|---|---|---|
| 4,146,831 | 3/1979 | Farr | 322/94 |
| 4,155,340 | 5/1979 | Fernquist et al. | 123/602 |
| 4,155,341 | 5/1979 | Fernquist et al. | 123/602 |
| 4,439,721 | 3/1984 | Mura | 320/61 X |
| 4,458,195 | 7/1984 | Piteo | 322/94 |

*Primary Examiner*—Tony M. Argenbright
*Attorney, Agent, or Firm*—Hill, Van Santen, Steadman & Simpson

[57] ABSTRACT

A high efficiency charging and regulating system charges a battery and regulates a voltage delivered to the battery. An alternator having a rotor with at least one magnet thereon and a stator in close proximity to the rotor has at least one alternator coil and at least one power coil. A regulating and charging device connects an output of the alternator coil to a system battery for delivering a regulated voltage to the system battery for charging thereof. Preferably, the charging and regulating means comprises a full wave SCR rectifier, gate inputs of which are controlled by voltage derived from the power coil.

20 Claims, 7 Drawing Sheets

HIGH-EFFICIENCY CHARGING AND REGULATING SYSTEM

RELATED APPLICATIONS

Co-pending applications of the same inventor also relating to ignition and charging systems are: Hall Effect Device Ignition and Charging System", U.S. Ser. No. 191,876 filed May 9, 1988; "High Efficiency Electrical Generating System", U.S. Ser. No. 191,875 filed May 9, 1988; and "Improved Stator Assembly and Method for Manufacture Thereof", U.S. Ser. No. 191,878 filed May 9, 1988.

BACKGROUND OF THE INVENTION

1. Field of the Invention

The present invention relates to engine ignition and charging/regulating systems, such as for gasoline engines with system batteries and associated vehicle electrical systems. More particularly, the present invention relates to marine engine ignition and charging/regulating systems.

2. Description of the Prior Art

It is known in vehicle electrical systems, including marine electrical systems, to generate electricity via alternator coils arranged in a stator assembly associated with a rotor driven by an engine. The rotor moves permanent magnets past pole faces of the stator having alternator coils, thereon, and the alternator coils generate a voltage output which varies with RPM. At low RPM, the voltage is relatively low, and at higher RPMs, the voltage increases.

The output of the alternator coils is connected to a system battery via a charging circuit also functioning to regulate voltage delivered to the system battery and vehicle electrical system connected in parallel to the system battery.

If the system battery, which is typically 12 volts, requires charging as indicated by a low voltage output at the battery, then the charging circuit applies voltage to the battery which is higher than the system battery static voltage so that current will flow into the battery and charge the same. Furthermore, the charging circuit also provides a regulating function relative to the battery and vehicle electrical system such that as the alternator coil voltage output increases above the nominal system voltage with increasing engine and associated rotor RPM, then the charging and regulating circuit maintains the output voltage at 14 volts, for example.

Such prior art charging and regulating circuits typically have been of two types. In a first type known as the "crowbar" or "shunt regulation systems", series connected back-to-back control devices such as SCRs with diodes in parallel thereto are connected parallel to or in shunt with the output of the alternator. At low RPM, the voltage output from the alternator coils is low (for example less than 12 volts), and the shunt control device path is off or open. As the engine RPM increases and the voltage rises, the shunt path begins to turn on such that additional current is drawn. Since the alternator coil winding is typically current limiting by nature, by drawing additional current through the alternator coils, the voltage output can be controlled, and is thus maintained at a given value such as 14 volts, for example. Thus, the 12 volt battery can be charged and the system voltage can be regulated.

At higher RPMs, as the no load voltage from the alternator rises, such as to 120 volts, for example, the shunt current path draws greater amounts of current. Accordingly, high power switching units such as high power SCRs and associated diodes are required. Substantial power is lost through heat dissipation and the cost of such a shunt system is high in view of the high power requirements of the shunt path components and heatsink requirements. For these reasons, it has been known in the prior art to alternatively employ what is known as a "full wave regulating system".

The second type is known as the full wave regulating system, which can be either a full wave center tab type or bridge rectifier type, for example. These circuits employ control devices connected in series with output end of the alternator coil in the manner of a full wave rectifying system. For example, an SCR can be connected in series at each end of the alternator coil. These SCRs have their gates self biased through voltage output sensing with a resistance of the alternator coil relative to the system battery voltage. Initially, the SCRs are turned off at low RPM, since the alternator coil output is, for example, 9 volts whereas the battery voltage is higher, namely 12 volts. When the alternator coil outputs a voltage above the battery voltage by an amount sufficient to create a bias voltage to turn on the SCR, then the SCR connects through at least a portion of the cycle of the alternator voltage to charge the battery. The upper limit of the system voltage is regulated by appropriate switching of the SCR such that as the alternator open circuit voltage rises to, for example 120 volts, the SCR is switched such that only a portion of the voltage waveform is fed through and the system voltage is thus regulated to 14 volts, for example.

Although this full wave prior art system does not have the control device power dissipation problems associated with the shunt regulating systems (since the control devices are in series rather than shunt), there are other disadvantages. At low RPM, the series connected control devices cannot turn on in view of SCR gate biasing problems caused by the need to choose a sensing resistance which does not result in excessive power loss at high voltage - high RPM alternator outputs. Thus the battery is not charged and the vehicle system is draining the battery at low RPMs. Since the sensing resistance in the gate control bias circuit of the SCRs must be chosen to have a relatively small resistance so that the SCRs will turn on as soon as practical at low engine RPMs, at high engine RPMs the dissipation of the resistor is significant in view of the increased voltage drop thereacross. Thus, not only does the system not charge the battery at relatively low RPMs, but also at high RPMs the biasing circuit resistance dissipates substantial amounts of power. Furthermore, resistors capable of dissipating such higher powers are costly.

SUMMARY OF THE INVENTION

It is an object of the present invention to improve upon and increase the operating efficiency and lower the cost of prior art charging and regulating circuits used in vehicles operated by engines such as gasoline engines in marine applications.

It is a further object of the invention to permit system battery charging to be initiated at relatively lower engine RPMs as compared to prior art systems such as the full wave regulating type.

It is another object of the invention to provide a charging and regulating system such that regardless of engine RPM, the overall heat dissipation of the system is low, and thus lower cost regulating components which do not dissipate large amounts of heat can be employed.

It is another object of the invention to provide a charging and regulating circuit which is of lower cost than prior art systems.

According to the present invention, a charging and regulating system is provided of a full wave center tap type whose control devices are biased by a voltage regulating circuit operated by a voltage supplied by a separate power coil which is independent of the alternator coils. The charging and regulating circuit becomes active at relatively low engine RPMs and begins charging the system battery as soon as the alternator coil voltage output is slightly above the system battery voltage. Furthermore, with the present invention, a high power dissipation resistor, and/or supplementary control slave devices, and/or high power dissipation control devices are not required. Furthermore, if the system battery is disconnected, such as being thrown overboard from the marine craft, the charging and regulating system shuts down so that excessively high voltages occurring at the alternator coils given high engine RPMs are not connected through to the vehicle electrical system.

A further advantage of the present system is that heat dissipation is minimized, and the greatest amount of heat is only generated at maximum required system load at max RPM.

Also, according to the invention, the separate power coil may perform a dual function and also supply an operation voltage to an ignition timing system. Thus, both an operation voltage for the ignition timing system and an operating voltage for the charging and regulating circuit can be supplied by a power coil which is independent of the alternator coils.

DESCRIPTION OF THE PREFERRED EMBODIMENTS

Figure 1:
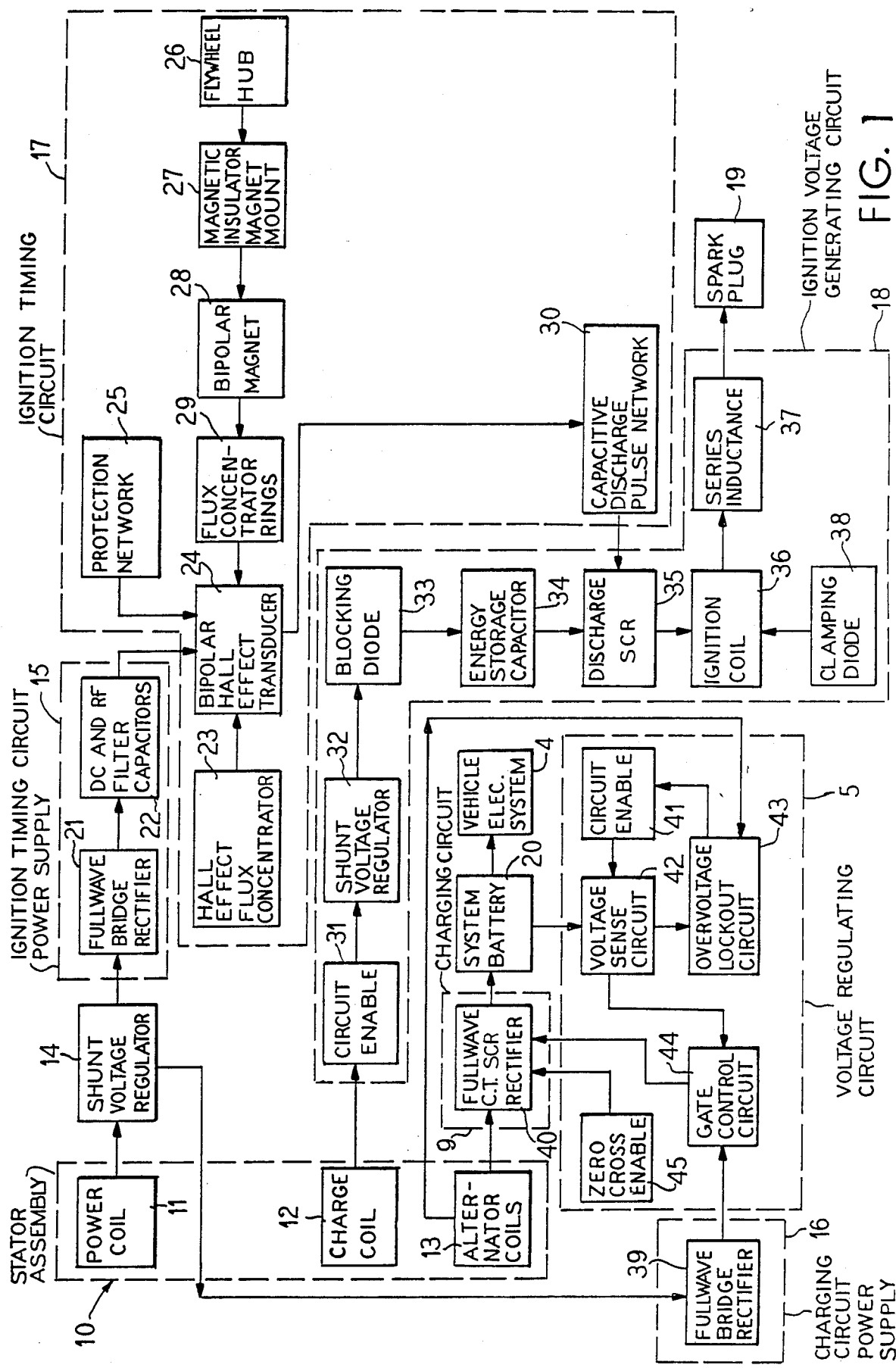
FIG. 1 is a block diagram of the Hall effect device ignition and charging system of the invention.

The block diagram of FIG. 1 generally shows the overall Hall effect device ignition and charging system of the present invention. The schematically illustrated stator assembly 10 has a power coil 11, charge coil 12, and alternator coils 13. The actual mechanical structure of the stator assembly 10 is shown in greater detail in the cross-sectional view of FIG. 2 and the top view of FIG. 3. The remainder of the circuit blocks shown in FIG. 1 are illustrated in greater detail in the detailed schematic diagram shown in FIGS. 4A, 4B, and 5, to be discussed hereafter.

The main circuit blocks of the Hall effect device ignition and charging system of the invention shown in FIG. 1 are as follows. Voltage from the power coil 11 is supplied via an ignition timing circuit power supply 15 to power the ignition timing circuit 17. Voltage from the power coil 11 is also fed via a charging circuit power supply 16 to the voltage regulating circuit 5.

The charge coil 12 of the stator assembly 10 provides voltage to the ignition voltage generating circuit 18 which in turn generates a high voltage for generating spark at the spark plug 19.

The alternator coils 13 provide supply voltage via a charging circuit 9 to the system battery 20 and to the vehicle electrical system 4 connected in parallel thereto. The voltage regulating circuit 5 controls operation of the charging circuit 9 so as to control voltage fed to the system battery 20. Of course, the system battery 20 also connects to the marine or automotive on-board electronics system to be powered, such as lighting, radios, heaters, and other accessories (not shown).

Referring now to FIG. 1 in greater detail, the power coil 11 feeds a shunt voltage regulator 14 which controls voltage output to both the ignition timing circuit power supply 15 and the charging circuit power supply 16.

The ignition timing circuit power supply 15 contains a full wave bridge rectifier 21 which outputs to DC and RF filter capacitors 22. The filter capacitors output power supply voltage to the bipolar Hall effect transducer 24 in an ignition timing circuit 17. Additionally a protection network 25 prevents damage to the bipolar Hall effect transducer 24 during system operation.

On the flywheel hub 26 a bipolar ceramic magnet 28 is mounted by a magnetic insulator magnet mount 27. Flux concentrator rings 29 concentrate the magnetic flux so as to precisely effect turn on and turn off of the bipolar Hall effect transducer in conjunction with the Hall effect flux concentrator 23 as described hereafter in reference to FIGS. 2 and 3.

Figure 3A:
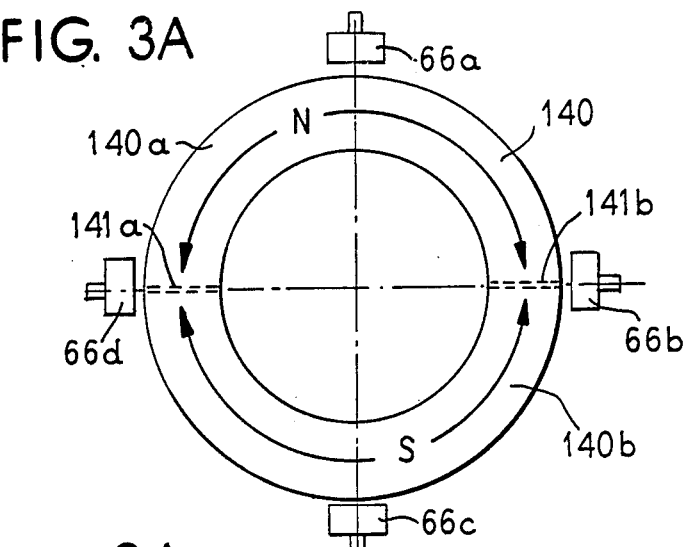
FIG. 3A is an alternate embodiment of a trigger magnet assembly employed in FIG. 3.
Figure 3:
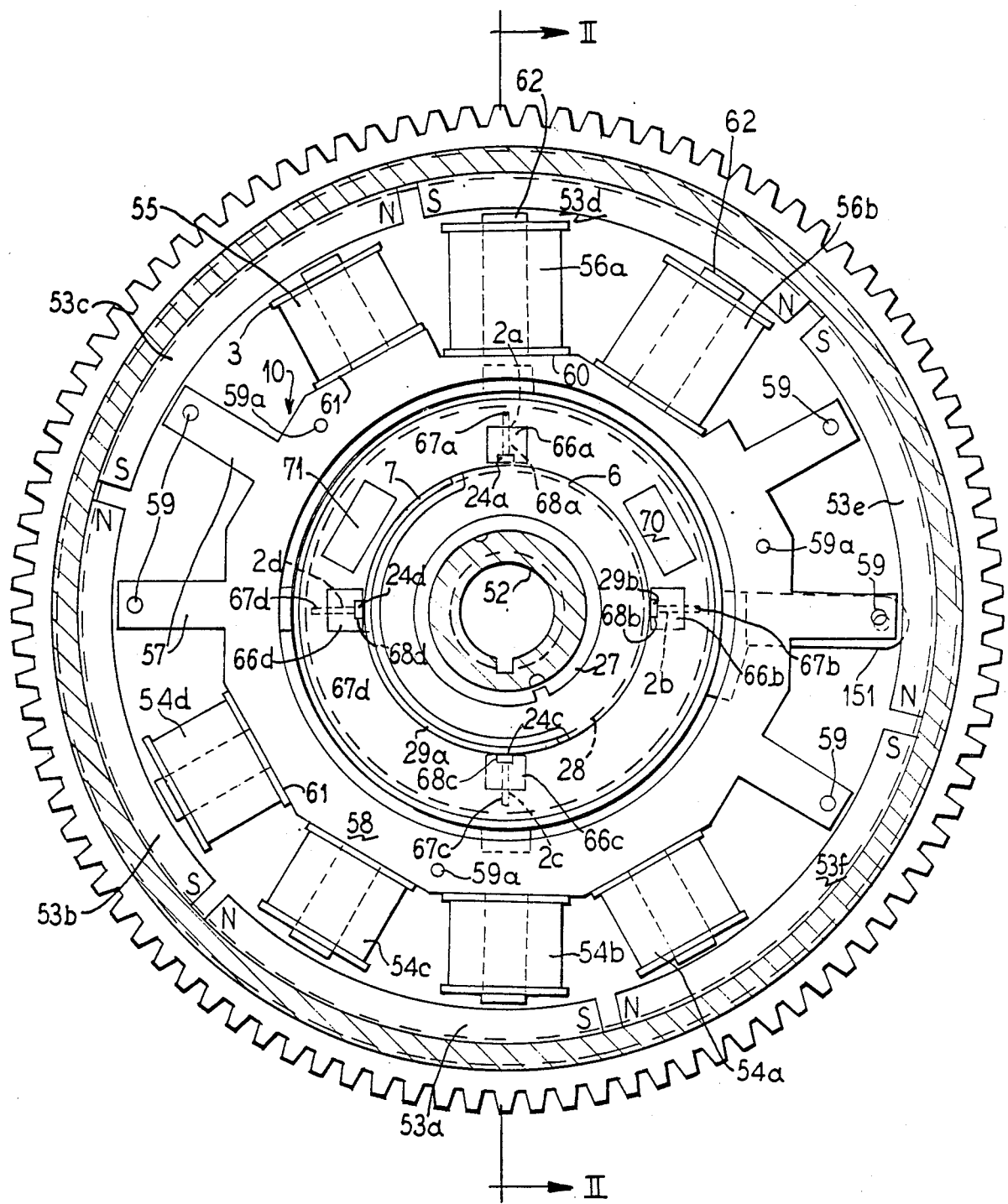
FIG. 3 is a top sectional view of the flywheel assembly, stator assembly, and ignition timing housing containing the Hall effect device in the ignition and charging system of the invention.

In an alternate embodiment of a portion of the system shown in FIG. 3, the bipolar magnet 28, magnetic insulator magnet mount 27, and flux concentrator rings 29 are eliminated and replaced with a plastic bonded ferrite molded magnet 140 shown in FIG. 3A. Such a magnet has a hemispherical north pole portion 140a and a hemispherical south pole portion 140b which converge with one another at first and second neutral sections 141a and 141b. The neutral sections must be as small as possible so that a sharp transition occurs between the north and south poles as the magnet rotates. It is preferred that the neutral sections have a width no greater than 0.045, and preferably having a maximum width of 0.03 inches with a design center of preferably 0.025 inches.

A switching signal from the bipolar Hall effect transducer 24 is fed to a capacitor discharge pulse network 30 so as to control the discharge SCR 35. Power is fed to the discharge SCR from the charge coil 12, through the circuit enable 31, shunt voltage regulator 32, blocking diode 33, and energy storage capacitor 34. The discharge SCR 35 then provides voltage to the ignition coil 36 in accordance with the desired timing of the ignition system so as to create a high voltage output to a series inductance 37 which in turn delivers a high voltage to a spark plug 19 for engine ignition. A clamping diode 38 also controls operation of the ignition coil 36.

The alternator coils 13 supply a charging voltage to the system battery 20 through full wave SCR rectifier 40. Additionally, the alternator coils supply voltage to the overvoltage lockout circuit 43. Circuit 43 outputs to circuit enable 41 which controls the voltage sense circuit 42 which also receives system battery voltage from battery 20. The over-voltage lockout circuit 43 is controlled by a separate over-voltage sense circuit 43a.

An output of the voltage sense circuit 42 connects to a gate control circuit 44 which in turn controls the full wave SCR rectifier 40. A zero cross enable circuit 45 also controls SCR rectifier 40. A full wave bridge rectifier 39 provides operating voltage to the gate control circuit 44.

Figure 2:
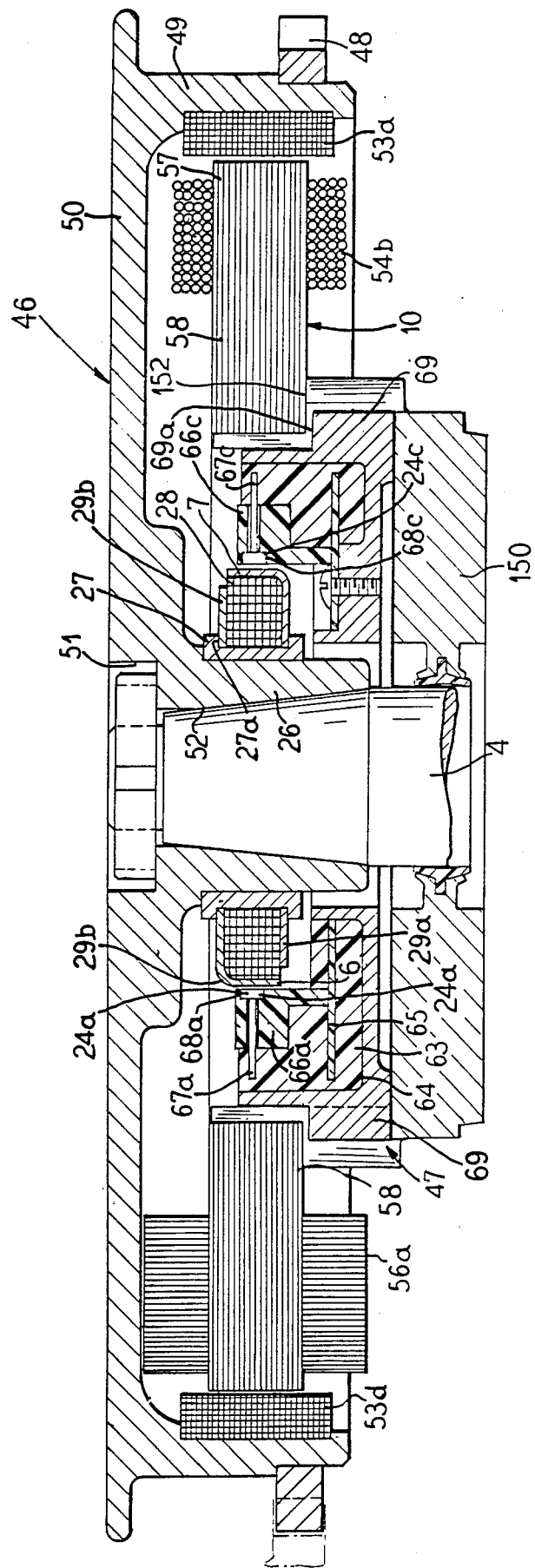
FIG. 2 is a cross-sectional view of the flywheel, stator assembly, and Hall effect device portions of the improved ignition and charging system of the invention, and represents a cross-sectional view taken along the lines II—II of FIG. 3.

Referring now to FIGS. 2 and 3, the mechanical relationship of the flywheel or rotor 46, stator assembly 10, and ignition timing housing 47 containing the Hall effect transducers 24a, b, c, d will now be described in greater detail. FIG. 2 is a cross-sectional view taken along line II—II of FIG. 3 illustrating the top view.

As shown most clearly in FIG. 2, the flywheel or rotor 46 rotates in accordance with the drive shaft 4 of the engine not shown here. Such a drive shaft would mount in aperture 52 and be secured at mounting aperture 51. A starting ring gear 48 is attached at a peripheral portion of outer circular wall 49 of the flywheel or rotor 46. Ring gear 48 may be employed for starting of the engine through engagement with a starter motor. Alternatively, in a marine engine the flywheel or rotor 46 may be rotated during starting by a manual pull cord, not shown.

Flywheel 46 includes an upper wall 50 and a flywheel central hub portion 26 at which the mounting apertures 51 and 52 are provided at the inside of the hub 26.

A plurality of north-south ceramic magnets 53a, b, c, d, e, f are provided on an inner surface of the circular wall 49 in a circular pattern as shown most clearly in the top view of FIG. 3. Adjacent end faces of the magnets alternate in polarity around the circle on which the magnets lie.

The stator assembly 10 is formed of a plurality of stacked laminations 58 shaped as shown in FIG. 3. Individual pole legs 57 and 62 are provided. The pole legs 57 are shorter and receive the power coil 55 or alternator coils 54a, b, c, d. Relatively longer pole legs 62 are provided for receiving charge coils 56a, b. The relatively longer pole legs 62 extend from a smaller radius surface 60 and the relatively shorter pole legs 57 extend from a larger radius surface 61 of the laminations.

Shorter legs can also be used for the charge coils, but increased copper mass on longer legs keeps the charge coils running cooler.

The laminations are held together by interior rivets 59a and also rivets 59 passing through ends of the unused pole legs to prevent vibration caused by the magnetic field. By use of the rivets 59, it is not necessary to impregnate the laminations.

The ignition timing housing 47 rests on a bearing cage 150 containing bearings for the motor crank shaft 4. The bearing cage 150 is an integral part of the engine. The laminations are supported on a cut-out step or shoulder 152. Four of such shoulders 152 may be provided.

The housing 47 may be rotatably positioned relative to the bearing cage 150 through fixing arm 151 (shown in FIG. 3) which extends from the housing 47. This fixing arm 151 may be secured in place after a desired timing has been achieved. By rotating the housing 47, the Hall effect devices are positioned relative to the magnetic timing means to achieve a desired timing relationship.

The housing 47 also has bosses or stop portions 69 having an upper surface 69a which serves to limit movement of the housing 47 in an axial direction of shaft 4 through abutment with a lower edge of the laminations 58.

The housing 47 retains the trigger or timing circuit PC board 65 impregnated in a pocket 64 therein.

Figure 2A:
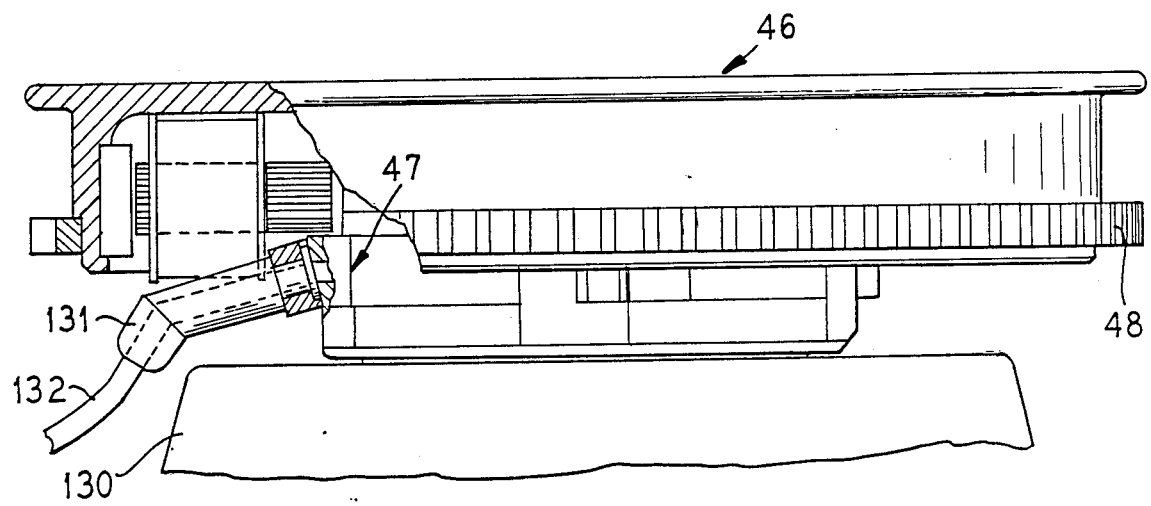
FIG. 2A is a side view of a trigger assembly with Hall effect devices in relation to the flywheel and engine block wherein a grommet unit conveys leads from the Hall effect device trigger assembly away from obstructions on the engine block.

As shown in FIG. 2A, lead wires 132 are guided from the housing 47. These wires connect to the PC board 65 having the Hall effect transducers associated therewith. In order to clear a top boss portion of the engine 130, an angled grommet 131 is provided. By use of this grommet, the wires readily clear obstructions on the engine.

Figure 2B:
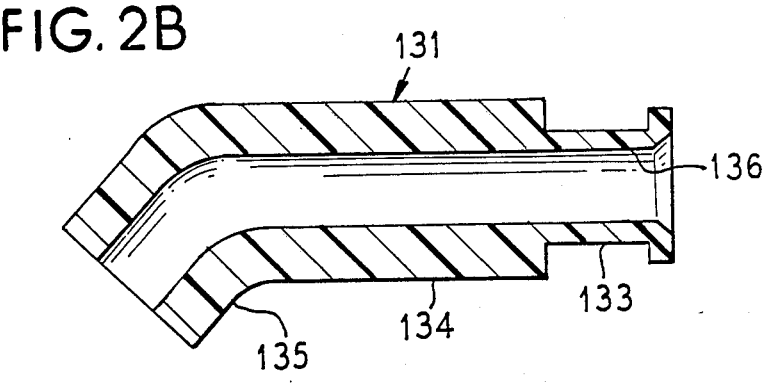
FIG. 2B is a cross-sectional view of the grommet shown in FIG. 2A.

FIG. 2B shows in cross-section the construction of the grommet 131. This grommet has an angled portion 135 which forms an angle of approximately 130° relative to a main body portion 134. A cut out ring-shaped portion 133 fits in a aperture of the housing 47 to retain the grommet there. A central passage 136 guides the wires through the grommet.

As shown in FIG. 3, the stator assembly 10 may, in one preferred embodiment, have a single power coil 55, two charge coils 56a and 56b, and four alternator coils 54a, b, c, and d. As can be seen in FIG. 3, additional pole legs are unused in this embodiment. However, if desired, to increase power capability, additional alternator coils, power coils, or charge coils can be provided.

As the flywheel rotates the magnets 53a, b, c, d, e, f past the end faces of the pole legs with the respective power, charge, and alternator coils thereon, voltages are generated in known fashion in the respective coils.

On the hub 26 of the flywheel or rotor 46, at an outer periphery thereof a magnet retainer 27 is provided as most clearly shown in FIG. 2. This magnet retainer supports a circular ceramic cylindrical magnet 28 together with an upper flux concentrator ring 29b and a lower flux concentrator ring 29a. The lower flux concentrator ring 29a has a partial side wall 7 which in the preferred embodiment shown here, extends approximately 180° as shown in FIG. 3. For the remaining 180°, it is not present. Rather, a corresponding side wall 6 extending down from the upper flux concentrator ring 29b is provided. These 180° side walls 6 or 7 thus alternately cover peripheral portions of the ring magnet 28 and respectively extend either from the top or the bottom of the ring magnet 28 at a periphery thereof. As discussed previously, the plastic bonded ferrite magnet of FIG. 3A may alternatively be employed.

The ignition timing housing 47 as shown in FIG. 2 contains the printed circuit board 65 for ignition timing circuitry and also contains a Hall device holder 66a, b, c, d at various locations around a circle as shown in FIG. 3. The Hall device holders 66a, b, c, d and circuit board 65 are impregnated in a potting compound 63 within the pocket 64 of the housing 47.

The bipolar Hall effect transducers 25a, b, c, d are mounted in the respective Hall device holders 66a, b, c, d and are positioned such that one surface of the transducer is directly adjacent to the flux concentrator ring side walls 6 or 7. A metal flux control rod 67a, b, c, d is positioned such that one end face is directly adjacent an opposite surface of the respective Hall effect transducers 24a, b, c, d and is also received within a respective aperture 2a, b, c, d of the Hall device holders 66a, b, c, d. These rods specifically locate the magnetic flux path onto the surface of the Hall effect transducers.

The Hall effect transducers 24a, b, c, d are received within respective pockets 68a, b, c, d of the Hall device holders 66a, b, c, d.

The metal rods 67a, b, c, d abut against the Hall device IC circuit outer wall so as to concentrate flux within a center of the integrated circuit of the Hall device.

As the flywheel or rotor 46 rotates, the transducers turn off and on in accordance with the flux concentrator ring outer walls 6 or 7 which are present. The flux concentrator ring 29b represents a north pole when the skirt 6 is present opposite the Hall effect transducer 24a as shown in FIG. 2. This turns off the Hall effect device. A south pole is represented by outer wall 7 as shown in the right-hand portion of FIG. 2. When this south pole is present, the Hall effect device 24c turns on.

By use of the sharp transitions between the ends of the skirts or side walls 7 or 6 (or sharp transition regions 141a, b in FIG. 3A) in combination with the sharp or narrow path flux concentration resulting by use of the metal rods 67a, b, c, d, a very sharp turn-on and turn-off characteristic occurs in the Hall effect transducer, independently of motor RPM. Thus, even at very slow motor RPM, the turn-on and turn-off of the Hall effect transducers is sharp, and a sharp or well-defined waveform with steep leading and trailing edges results at the output of the Hall effect transducers. The output waveform is substantially uninfluenced by the RPM.

As shown in FIG. 3, electrolytic capacitor 70 may be mounted between Hall effect transducer 24a and 24b and a further electrolytic capacitor 71 may be mounted between Hall effect transducer 24a and 24d on the ignition timing housing 47. In the preferred embodiment of the invention, the metal flux concentrating rods 67a, b, c, d preferably have a diameter of approximately 0.06 inches.

The structure of the circuit block shown in FIG. 1 will now be described in greater detail by reference to FIGS. 4A, 4B, and 5.

Figure 4A:
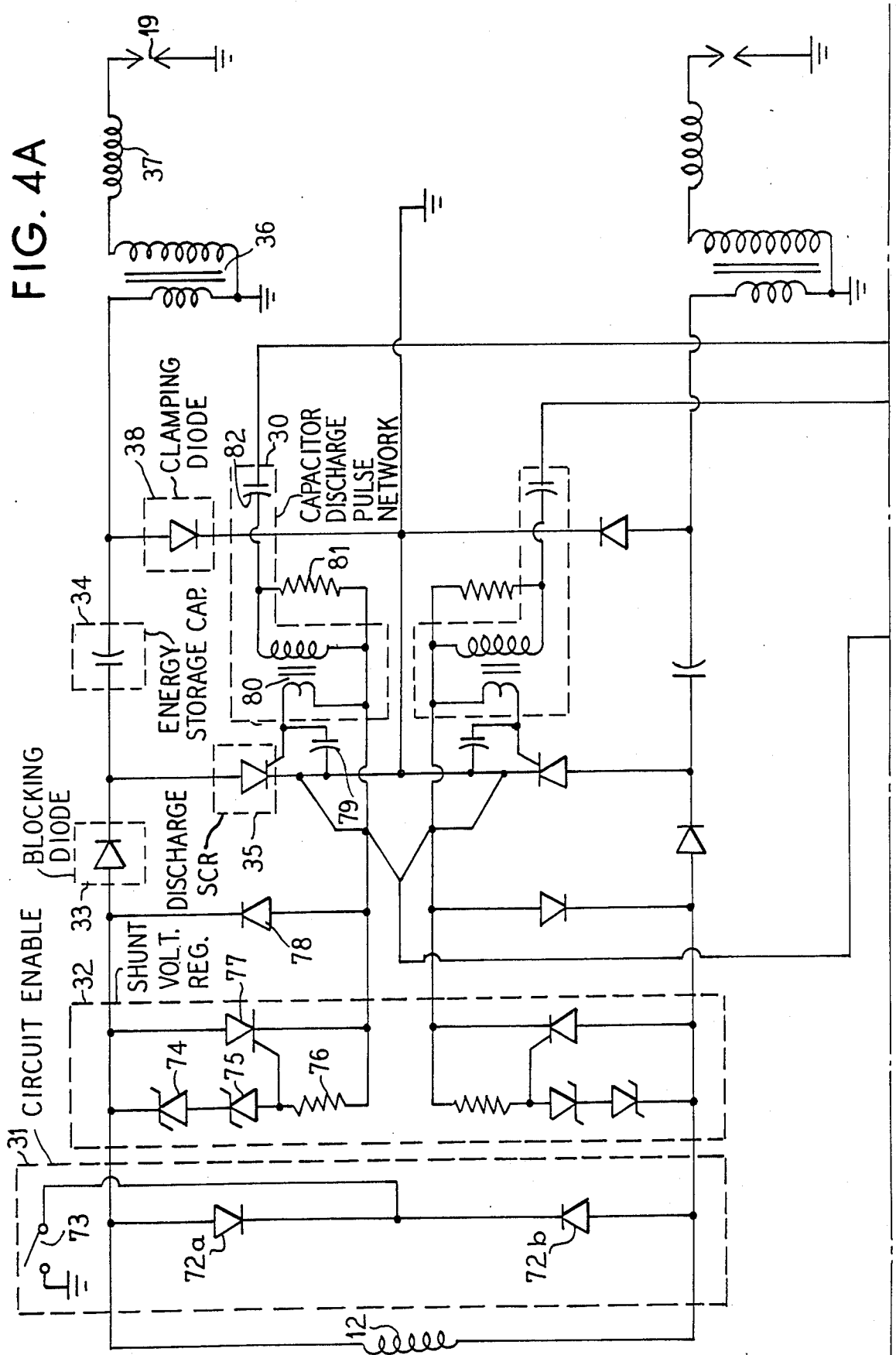
FIGS. 4A and 4B are, taken together, a detailed schematic diagram showing circuits fed by the charge coil and power coil, including the ignition timing circuit shown in the block diagram of FIG. 1.

As shown in FIG. 4A, at the output of charge coil 12 a circuit enable 31 is provided with a kill switch 73 for temporarily grounding outputs of the charge coil through diodes 72a, 72b. This results in no voltage to the ignition coil and thus no spark at the spark plugs 19, thus shutting off the engine.

The shunt voltage regulator 32 includes two identical sections formed of an SCR 77, series connected Zener diodes 74 and 75 connecting to the gate of the SCR 77, and bias resistor 76. A diode 78 is connected in parallel with the SCR 77. A blocking diode 33 connects voltage from the charge coil 12 through an energy storage capacitor 34 to the ignition coil 36. The capacitor discharge pulse network 30 controls a discharge SCR 35 connected between ground and one side of the energy storage capacitor 34. The gate of SCR 35 is controlled by the capacitor discharge pulse network 30 by current present at the secondary of transformer 80, which serves as a current amplifier. Capacitor 79 is provided in parallel with the gate of the SCR 35 and its cathode.

The primary of the current amplifying transformer 80 has a resistor 81 connected in parallel therewith, and a capacitor 82 is connected in series. The resistor 81, capacitor 82, and Hall device output form a control pulse for the primary of the transformer.

As shown in FIG. 4A, the other side of the charge coil also has a similar discharge SCR and capacitor discharge pulse network, and energy storage capacitor with associated blocking diode in mirror image fashion. The mirror image side of the circuit also supplies an ignition coil 36.

With the invention, the capacitor discharge pulse network 30 in FIG. 4A is controlled by the Hall effect device 24. When the Hall effect device 24 turns on, it discharges capacitor 82 into pulse transformer 80, so as to provide a turn-on pulse for discharge SCR 35. Upon complete discharge of energy storage capacitor 34, the SCR 35 again turns off. Without the capacitive discharge pulse network, the discharge SCR 35 will be on for a full 180°, corresponding to a full south pole of the trigger magnet. Thus, with the invention, less power is required to be output by the charge coil.

Figure 4B:
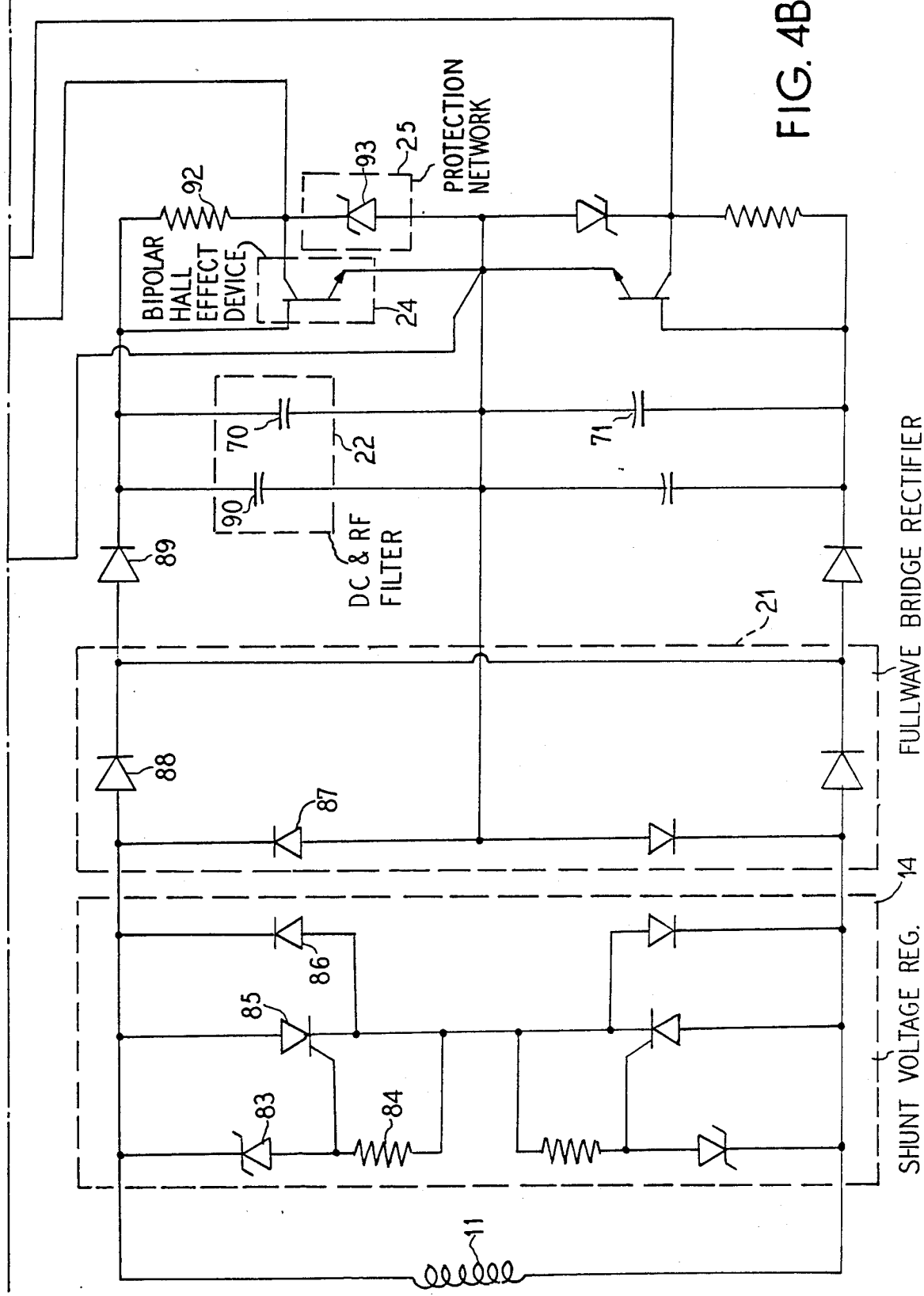

In FIG. 4B the power coil 11 is shown connecting with the shunt voltage regulator 14. The shunt voltage regulator 14 is formed of a mirror image circuit with one side being formed of a Zener 83, a resistor 84 controlling a gate of an SCR 85. A diode 86 connects across the SCR 85.

The output of the shunt voltage regulator 14 connects to a full wave bridge rectifier 21 formed of diodes 87 and 88 and the mirror image thereof. A steering diode 89 connects output voltage to the DC and RF filter 22 formed of a high frequency RF capacitor 90 and low frequency electrolytic capacitor 70. Filtered power supply voltage is then fed to the bipolar Hall effect transducer 24. This transducer is an integrated circuit assembly provided by Micro Switch, Inc., Honeywell Division, Freeport, Ill. as No. SS46. It includes a Hall effect device, trigger circuit, amplifier, voltage regulator, and Schmitt trigger. As previously explained, this Hall effect transducer is switched on and off by the aforementioned magnetic flux paths which are switched from north to south.

A resistor 92 bridges an output and input of the Hall effect transducer 24. The protection network 25 includes a Zener diode 93 connected across the output of the Hall effect transducer 24.

A mirror image of the circuit described above connects to the other side of the power coil.

The output of the Hall effect transducer 24 provides a switching voltage to the aforementioned capacitor pulse discharge network 30.

With the inventive circuit provided, the bipolar Hall effect device is off when the north pole is present at the device and is on with a south pole present. This results in a very efficient switching of the discharge SCR 35, independently of engine RPM.

With the invention, if the flywheel runs backwards, the engine won't start, unlike some prior art engines. This favorable result occurs since the bipolar Hall effect device will trigger the discharge SCRs 180° after top dead center when the pistons are at full downstroke.

Figure 5:
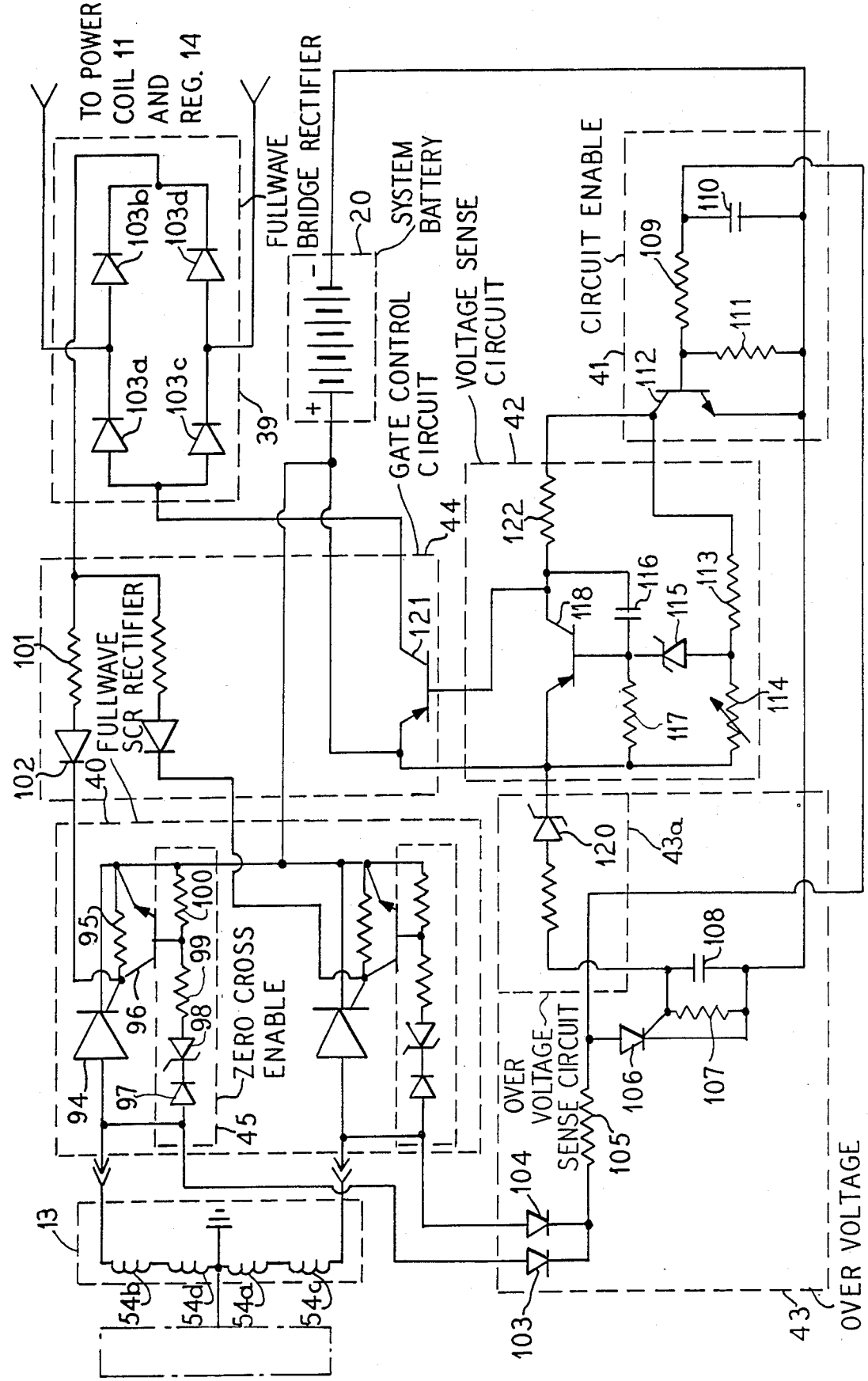
FIG. 5 is a detailed schematic diagram showing the circuits fed from the alternator coils and including the charging circuit and voltage regulating circuit shown in the block diagram of FIG. 1.

Referring now to FIG. 5, alternator coils 13 comprise individual stator coils 54b and 54d connected in series at one side, and alternator stator coils 54a and 54c connected in series at the other side. The series connected stator coils are connected at their output to respective full wave centertap SCR rectifier circuits 40. These circuits 40 comprise an SCR 94 whose gate is controlled by a transistor 96 having a resistor 95 in parallel with collector and emitter. A zero cross enable circuit 45 controls transistor 96. This zero cross enable circuit 45 includes a diode 97 connected in series with a Zener 98, resistor 99, and resistor 100.

The full wave center tap SCR rectifier circuit 40 is also controlled by a gate control circuit 44 formed of a resistor 101 and diode 102 receiving voltage from the full wave bridge rectifier 39 formed of diodes 103a, 103b, 103c, and 103d connected to the power coil 11 and shunt voltage regulator 14.

The alternator coils 13 also feed an over-voltage lockout circuit 43 which includes diodes 103 and 104 connecting to resistor 105, which in turn connects to SCR 106. The gate of SCR 106 is controlled by resistor 107 and capacitor 108, and by an output from the over-voltage sense circuit 43a. An output of the over-voltage lockout circuit 43 connects to a circuit enable 41 at capacitor 110, resistor 109, and resistor 111. Transistor 112 of the circuit enable 41 has its output connected to control the voltage sense circuit 42. Voltage sense circuit 42 includes a transistor 118 whose gate is connected to a resistor 117 and capacitor 116, and also to a Zener diode 115. The Zener diode 115 at its anode has a voltage divider formed of variable resistor 114, and resistor 113. A bias resistor 122 connects to transistor 121.

The gate control circuit 44 includes a transistor 121 whose input connects to an output of the voltage sense circuit 42 and whose output at the emitter senses the voltage at the positive terminal of the 12-volt battery 20. The full wave bridge rectifier 39 supplies power to the collector of transistor 121 in the gate control circuit 44.

With the present invention, the zero cross enable circuit 45 turns on the full wave centertap SCR rectifier circuit 40 substantially only at the zero cross point of the SCR so as to prevent radio frequency interference.

If the engine is off, then the circuit enable 41 prevents battery current from being drained. The over-voltage lockout circuit 43 shuts down the charging circuit if there is a voltage sensing problem, or if the battery is accidentally disconnected from the circuit, such as the battery being thrown from the boat accidentally during maneuvering, or if the boat is hit by a wave or makes a sharp turn.

OPERATION OF THE IMPROVED CHARGING AND REGULATING SYSTEM OF THE INVENTION

An operational description of the improved charging and regulating system of the invention will now be provided. Referring to the block diagram of FIG. 1 and the schematic diagram of FIG. 5, alternator coils 13 generate a voltage which increases with increasing engine RPM. Furthermore, the separate power coil 11, which is independent of alternator coils 13, provides a voltage to shunt voltage regulator 14 which is supplied not only to the bipolar Hall effect transducers, but also is fed via the full wave bridge rectifier to provide an operating voltage used to form a gate control voltage in the voltage regulating circuit 5.

At low engine RPMs, the alternator coil outputs will be less than the battery 20 voltage which is, for example, 12 volts. However, even when the alternator coil voltage is less than the battery voltage of 12 volts, the gate control circuit 44 provides a gate voltage to the SCR rectifiers 94 in the charging circuit 9. Thus, as soon as the output voltage from the alternator coils 13 is equal to the battery voltage 20 plus the forward voltage of the SCR rectifiers, the SCR rectifiers turn on, the system battery is charged, and power is delivered to the vehicle electrical system. This contrasts with the prior art full wave systems wherein the control devices would not turn on until a substantially higher RPM representing a higher output voltage from the alternator coils occurred. Furthermore, there is very little power dissipation in the biasing circuit of the invention in view of the use of a separate power coil 11 to provide the gate voltage independently of the alternator coils.

The system battery voltage is sensed by the voltage sense circuit 42 and compared in the gate control circuit 44. Thus, the system can determine whether or not the system battery requires charging.

The charging circuit 9 also regulates the voltage to the vehicle electrical system. When the alternator coils output a high voltage at high engine RPMs, the SCR rectifiers are operated for a smaller percentage of time such that a smaller portion of the waveform is fed through, thus controlling the overall system voltage.

If the engine is off and no voltage is being produced at the alternator coils, then the circuit enable 41 via components 103, 104 and 105, shuts down the voltage sense circuit so that the voltage regulating circuit 5 will not drain the system battery.

If the battery is accidentally disconnected from the circuit such as accidentally being thrown overboard from a boat during maneuvering, the overvoltage lockout circuit 43 in combination with the voltage sense circuit 42 and circuit enable 41 senses such a condition and shuts down the charging circuit 9 via a gate control circuit 44. Thus, excessively high voltages from the alternator coils 13 at high engine RPM are not delivered to the vehicle electrical system 4. Thus, the system is protected against overvoltage in such a case.

With the present invention, the zero cross enable circuit 45 turns on the full wave center tap SCR rectifier circuit 40 substantially only at the zero cross point of the SCR so as to prevent radio frequency interference.

Also, with the invention, the separate power coil not only generates a voltage used for biasing in the charging and regulating system, but also generates a voltage for operation of the Hall effect transducers. A traditional pick-up coil is not employed to provide a triggering voltage. Rather, Hall effect transducers in combination with the previously described triggering electronics provides this function. The Hall effect transducer either sees a north or south magnetic flux and switches on or off virtually instantaneously. The flux change which triggers the Hall effect device occurs quickly and precisely in view of the aforementioned magnetic flux concentration apparatus, including the flux concentrator ring side walls or skirts 6 and 7 and the flux concentrator rods 67a, b, c, d.

In view of the above, the Hall effect transducers produce a well-defined output waveform which has steep leading and trailing edges and which has a pulse width substantially independent of RPM. This is unlike the prior art pickup coil which generated a broad wave shape, the profile of which changed with RPM. Thus, with the invention the timing is very precise and is virtually independent of RPM.

This allows the engine, and particularly a marine engine, to start at low RPM. Even at such low RPM, with the present invention the rapid flux change permits a high amplitude, well-defined signal to be generated by the trigger or timing circuits. This contrasts with the prior art wherein at low RPM the pickup coils would generate very little voltage since slow flux changes would result. Additionally, the shape of the output waveform from the pickup coils would change with RPM and would be quite broad at lower RPMs.

Timing can be set very precisely in view of the design shape of the flux concentrator rings 29a and b and their associated side walls or skirts 6 and 7. Also, the provision of the flux concentrator rod 67a, b, c, d can be precisely adjusted relative to a center of the Hall effect transducer circuit so that a very high flux density at a very precise location can be provided for influencing the Hall effect device within the Hall effect transducer. Thus, the system can have high sensitivity coupled with ease and stability of timing adjustments.

Although various minor changes and modifications might be proposed by those skilled in the art, it will be understood that I wish to include within the claims of the patent warranted hereon all such changes and modifications as reasonably come within my contribution to the art.

I claim as my invention:

1. A charging and regulating system for charging a battery and regulating a voltage delivered to the battery, comprising:
   an alternator having a rotor with at least one magnet thereon, and a stator in close proximity to the rotor having at least one alternator coil and at least one power coil;
   control means connecting an output of the alternator coil to the system battery for delivering a regulated voltage to the system battery for charging thereof, said control means having a control input;
   voltage regulating means connected to the control input for creating a control voltage; and
   means for connecting a voltage output by the power coil to the voltage regulating means for use in creating said control voltage connected to the control input of the control means.

2. A system according to claim 1 wherein the control means comprises a charging circuit formed of a full wave rectifier.

3. A system according to claim 2 wherein the full wave rectifier comprises a centertap full wave rectifier and wherein at least two SCRs are provided whose gate inputs are connected to said control input.

4. A system according to claim 1 wherein said connecting means comprises a shunt voltage regulator connected in series with a full wave rectifier.

5. A system according to claim 1 wherein said voltage regulating control means has SCR rectifiers with respective gates, and said means comprises a gate control circuit having a first input connected to said connecting means, and a second input connected to receive a reference voltage indicative of system battery voltage 6. A system according to claim 5 wherein a voltage sense means is connected to sense system battery voltage and has an output at which said reference voltage is connected to said gate control circuit second input.

7. A system according to claim 1 wherein said voltage regulating means includes means for turning off the control means if a voltage of the system battery is interrupted so that alternator coil voltage is not applied to the system battery.

8. A system according to claim 1 wherein the voltage regulating means includes means for preventing system battery drain by the voltage regulating means when an engine in the vehicle is not running and the alternator coils are not outputting a voltage.

9. A system according to claim 1 wherein an ignition timing circuit is provided and means are provided for connecting voltage from the power coil to the ignition timing circuit.

10. A system according to claim 8 wherein said ignition timing circuit includes a bipolar Hall effect transducer means having an input connected to the power coil.

11. A system according to claim 1 wherein said control means has an SCR connected in series with each end of the alternator coil and respective gates connected to the control input of the control means.

12. A system according to claim 11 wherein zero cross enable means are provided to insure switching of the SCRs when a voltage waveform applied to the SCRs is crossing a zero reference line.

13. An electrical charging and regulating system, comprising:
   an electrical power alternator having alternator coils and a power coil independent of the alternator coils;
   a system battery connected in parallel to an electrical system associated with the battery;
   a full wave charging means connecting an output of the alternator coils to the system battery for charging the system battery and for regulating voltage delivered to the electrical system; and
   a voltage regulating means connected to control the charging means, and having a first input connected to the system battery and a second input connected to the power coil.

14. A system according to claim 13 wherein the charging means comprises a full wave centertap rectifier having only two SCR control devices each having a control input connected to the voltage regulating means.

15. A charging system for use with an engine having a battery associated therewith, comprising:
   a rotor with an associated stator assembly, the stator assembly having at least one alternator coil and at least one power coil;
   charging means connecting an output of the alternator coil to the battery for charging thereof; and
   a voltage regulating means for supplying a control voltage to the charging means based on battery voltage and based on an output voltage of the power coil, said power coil being separated from the alternator coil.

16. A system according to claim 15 wherein the charging means comprises a full wave rectifier formed of at least two SCRs and having gates of the SCRs connected to the voltage regulating means.

17. A system according to claim 15 wherein the charging means comprises a full wave rectifier having at least first and second SCRs whose gates are controlled by the voltage regulating means, and wherein a voltage regulator is connected to an output of the power coil, and a full wave rectifier is connected between the voltage regulator and the voltage regulating means.

18. A system according to claim 15 wherein the stator assembly also has a charge coil connecting to an ignition voltage generating means for generating a voltage for a spark plug of the engine, and an ignition timing means is provided which is also connected to the power coil at an input and at an output controls the ignition voltage generating means.

19. A system according to claim 18 wherein the ignition timing mean comprises Hall effect device means for sensing a position of the rotor.

20. A charging and regulating system for charging a battery and regulating a voltage delivered to the battery, comprising:
- an alternator having a rotor with at least one magnet thereon, and a stator in close proximity to the rotor having at least one alternator coil and at least one power coil;
- charging and regulating means connecting an output of the alternator coil to the battery for delivering a regulated voltage to the battery for charging thereof, said charging and regulating means having a first input connected to said power coil and a second input connected to the battery.

* * * * *